(12) United States Patent
Gianfrancesco

(10) Patent No.: US 6,305,181 B1
(45) Date of Patent: Oct. 23, 2001

(54) HEAT PUMP ABLE TO OPERATE WITH VERY LOW EXTERNAL TEMPERATURE

(76) Inventor: Roberto Gianfrancesco, Largo Lamarmora, 3, 20099 Sesto San Giovanni, MI (IT)

(*) Notice: Subject to any disclaimer, the term of this patent is extended or adjusted under 35 U.S.C. 154(b) by 0 days.

(21) Appl. No.: 09/424,254

(22) PCT Filed: May 13, 1998

(86) PCT No.: PCT/EP98/02810

§ 371 Date: Nov. 30, 1999

§ 102(e) Date: Nov. 30, 1999

(87) PCT Pub. No.: WO98/54520

PCT Pub. Date: Dec. 3, 1998

(30) Foreign Application Priority Data

May 30, 1997 (IT) .............................................. MI97A1285

(51) Int. Cl.[7] .................................................. F25B 13/00
(52) U.S. Cl. ............................................ 62/324.2; 62/476
(58) Field of Search .................................... 62/324.2, 476

(56) References Cited

U.S. PATENT DOCUMENTS

| | | |
|---|---|---|
| 3,126,720 | 3/1964 | Stubblefield . |
| 3,483,710 * | 12/1969 | Bearint ...................................... 62/79 |
| 3,491,545 | 1/1970 | Leonard, Jr. . |
| 3,556,200 | 1/1971 | Leonard, Jr. . |
| 3,928,983 | 12/1975 | Ainbiner et al. . |
| 4,440,001 | 4/1984 | Vardi et al. . |
| 4,475,361 | 10/1984 | Alefeld . |
| 4,505,123 * | 3/1985 | Kusakabe et al. ...................... 62/148 |
| 4,667,485 * | 5/1987 | Ball et al. ............................... 62/476 |
| 5,177,979 * | 1/1993 | Gianfrances ........................... 62/335 |

FOREIGN PATENT DOCUMENTS

| | | |
|---|---|---|
| 0 470 432 A1 | 2/1992 | (EP) . |
| 4-139361 | 5/1992 | (JP) . |
| 4-295555 | 10/1992 | (JP) . |

* cited by examiner

Primary Examiner—Michael Buiz
Assistant Examiner—Melvin Jones
(74) Attorney, Agent, or Firm—Oblon, Spivak, McClelland, Maier & Neustadt, P.C.

(57) ABSTRACT

A heat pump in which there are provided two separate but mutually interacting and communicating absorption devices, in which in the evaporator of the first device a liquid is present having a low freezing point such as to be able to operate as a heat pump recovering heat from an external fluid having a temperature even of 0° C. or less.

3 Claims, 1 Drawing Sheet

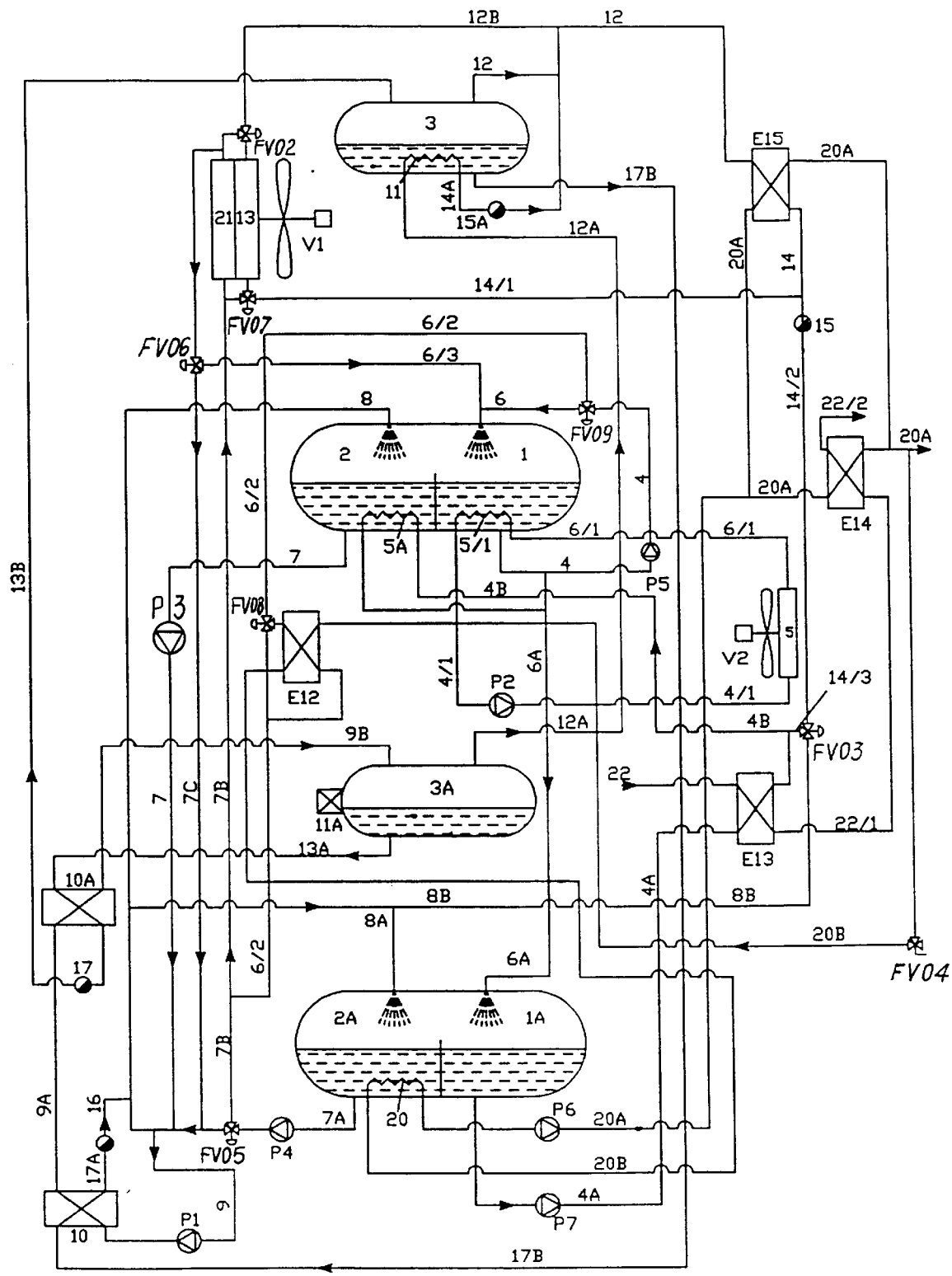

HEAT PUMP ABLE TO OPERATE WITH VERY LOW EXTERNAL TEMPERATURE

This invention relates to a double-acting apparatus for heating as a heat pump and, respectively, for cooling a fluid, in particular air. The object of the invention is to solve the problems arising in currently known double-acting machines when they are to be used as heat pumps for environmental heating.

Currently available apparatus use water as the refrigerant and a $LiBr/H_2O$ solution as the absorbing liquid. Known double-stage machines consist of an evaporator, an absorber, two generators and two condensers connected together in accordance with a scheme well known to the expert of the art. The heat has to be yielded by the condenser at low temperature and by the absorber, the heat produced in the absorber being at a relatively low temperature of between 32 and 42° C. and consequently unusable for heating.

The patents EP-B-470432 and U.S Pat. No. 3,483,710 describe double-acting absorption systems having two interacting but non-communicating circuits, in which there are two separate stages, namely the first and second stage, each consisting of an evaporator, an absorber, a generator and a condenser, wherein the first stage receives heat via the evaporator from an external fluid, for example from icy water originating from an air treatment plant, and simultaneously yields heat via the absorber to the evaporator of the second stage, which in its turn yields the heat of its absorber to the outside environment. The dilute solutions from the absorbers are fed to respective generators, the generator of the second stage being heated by an external energy source, whereas the generator of the first stage is heated by the steam produced in the second stage, and in this manner operates as a high temperature condenser, whereas the steam produced in the generator of the first stage is condensed by heat transfer against an external fluid, generally air. The concentrated solutions and the condensed refrigerants return to the respective apparatus from which they originate. The main object of the two cited patents is to provide absorption machines which can be cooled by air even in tropical zones, so avoiding the use of evaporation towers which make absorption machines difficult to use especially on a small scale, and hinder their acceptance. Moreover as they are provided with an evaporator, an absorber, a generator and a condenser for each stage, such apparatus can operate as heat pumps, yielding energy from the second stage absorber and from the first stage condenser at temperatures suitable for winter heating. The apparatus described in the cited patents have however a serious drawback in that as the two devices interact but are separate, rigid control has to be provided in order to be able to ensure that the system heat balance, which requires that the input enthalpies are always equal to the output enthalpies, is satisfied under all situations. Separating the two stages prevents such apparatus being able to undergo auto-regulation as difficult temperature control of the condensed refrigerant entering the evaporators is required to be able to ensure that the heat balance is satisfied.

A further heat pump is that illustrated in U.S Pat. No. 4,475,361, which describes an apparatus schematically similar to that of the present invention and able to operate as a heat pump to provide heat at a temperature suitable for environmental heating purposes. However, according to that patent, the temperature at the low pressure evaporator is about 0° C. (as indicated in column 9, line 14, point "F"), even though the evaporator contains a small quantity of LiBr used as antifreeze, this practice being already known to the expert of the art and widely used in commercially available absorption machines. The temperature usable in the evaporator limits the operation of the heat pump of the said patent, to a temperature of about 10° C. less than the external air or fluid from which heat is to be recovered, this value being too high because it totally prevents the use of the apparatus as a heat pump when the external temperature is less than 10° C. This drawback also applies to the other two aforesaid patents.

The object of the present invention is to provide a heat pump able to operate with an external temperature of down to 0° C. or even less.

The heat pump of this invention uses in the low pressure evaporator a mixture of low freezing point, preferably $LiBr/H_2O$ having a freezing point sufficiently low to allow evaporation at a temperature of about −10° C., so enabling heat to be recovered from the external air or from the fluid from which heat is to be recovered, down to an air or fluid temperature of 0° C. or less, while still achieving a temperature at the second stage absorber such as to be usable for environmental heating. The concentration of LiBr or of substances having the same function within the evaporator is that necessary to obtain the aforesaid freezing point, consequently its influence on the evaporator temperature is modest and merely of the order of 2–3° C., which virtually has no influence on machine efficiency.

Moreover in U.S Pat. No. 4,475,361 (as indicated in its FIG. 2a and as expressly stated in claim 1), the concentrated solution originating from the generators feeds in series firstly the high-temperature absorber G and then the low-temperature absorber E. It follows that the entire dilute solution is fed to the generators, so creating considerable problems. For example, to achieve a good coefficient of performance (C.O.P.) the minimum possible solution for concentration must be fed to the generators, so increasing to a maximum the concentration difference between the dilute solution entering and the concentrated solution leaving, whereas in the absorbers, to achieve effective heat transfer between the absorbent solution and the cooling fluid flowing within the heat exchanger tubes, it is advisable for the solution throughput to be relatively high, in particular using spray nozzles, as stated in the said patent. It should also be noted that the aforementioned drawback is further aggravated in the case of machine operation with partial load. In such a case, as indicated in FIG. 2a, the throughput of the pump 42 which feeds the generators is reduced by the valve 70, with the result that the concentrated solution returning to the absorbers decreases, this decrease also causing a variation in the pressure drop and spray angle of the nozzles, so making it difficult to ensure that all the absorbent solution comes into contact with the tubes through which the cooling liquid flows. That solution part which is not cooled cannot absorb the steam from the evaporator, so resulting in a loss in machine efficiency.

The U.S Pat. No. 3,556,200 describes a heating and cooling system comprising one generator (10), one condenser (11) and also two absorbers (13,14) and two evaporators (16,17) operating at different pressure levels: a siphon tube (37) connects the two absorbers, and a siphon tube (78) connects the two evaporators. Like in U.S Pat. No. 4,475, 361 the entire dilute solution coming from the two absorbers is fed to the generator (10), thus suffering of the same drawbacks pointed out for such patent. It is to be noted that the two absorbers (13,14) are serially connected with the consequence that the concentrations of the liquids fed to each absorber are different, so that the temperature difference between the high pressure absorber (14) and the respective evaporator (17) is lower than that existing between the low pressure absorber (13) and its evaporator (16): the consequence is that cooling of absorber (14) is more difficult than it would be should the concentration of the liquid in it be same as in the absorber (13).

In the heat pump according to the present invention, the dilute solution originating from the absorbers is mixed and partly fed to the generators. The remainder is recycled by a pump after being mixed with the concentrated solution originating from the generators, forming an absorbent solution which is again fed to the absorbers. In this manner the aforesaid and other drawbacks are eliminated because it is possible to control the concentrations of the dilute solutions withdrawn from the absorbers to be nearly the same.

This invention therefore differs substantially from know heat pumps and in particular from those described in the aforesaid patents.

A heat pump comprising:

first and second absorption devices each having an evaporator (1;1A), an absorber (2;2A9 containing a steam absorbing liquid to form a dilute solution, a generator (3;3A), a heating element (11;11A) for boiling absorbing liquid in the generator with the formation of steam and a condensing heat exchanger (11;13, E15) for condensing the steam, whereby the pressure present in the first generator (3) is less than the pressure present in the second generator (3A), means for maintaining within the evaporator (1) and absorber (2) of the first device a pressure less than that within the evaporator (1A) and absorber (2A), respectively, of the second device, comprising a first syphon connected between the evaporators (1,1a) and second syphon connected between the absorbers (2,2A), a fluid conduit for withdrawing the liquid present in the second evaporator (1A) by a pump (P7), passing it through a heat exchanger (5A) for absorbing heat and returning it to the second evaporator (1A), a fluid conduit for withdrawing dilute solution from the absorbers (2,2A), mixing a portion thereof and feeding the mixed dilute solution by a single pump (P1) to the second generator (3A) and to the first generator (3) in succession, fluid conduits for returning the condensed liquid from the condensing heat exchangers (11;13,E15) to the evaporators (1,1A), fluid conduits for connecting the generators (3,3A) to the absorbers (2,2A) to feed them with the concentrated absorbing liquid after cooling it in heat exchangers (10,10A) in which the dilute liquid originating from the absorbers (2,2A) is heated, an external heat source for the second heating element (11A) and a solution of low freezing point in the first evaporator (1).

Preferably said solution of low freezing point is a solution of lithium bromide in water, preferably of a concentration of about 20% by weight.

In order to further clarify the understanding of the structure and characteristics of the apparatus of this invention, a simplified embodiment is described hereinafter by way of non-limiting example with reference to the accompanying drawing, on which the single FIGURE represents schematically a heat pump for heating and cooling a fluid.

The apparatus shown schematically on the drawing comprises two separate but interacting devices which are connected together. The two absorption devices individually considered are of traditional structure and operation and are well known, so that they will not be described in detail, the ensuing explanation being sufficient for their understanding.

The two devices each comprise an evaporator (1, 1A) and an absorber (2, 2A) with the evaporator communicating with the respective absorber, the evaporator (1) communicating with the evaporator (1A) and the absorber (2) communicating with the absorber (2A), the communication between the evaporators and between the absorbers of the two devices being liquid-side communication and being effected by means of syphons so as to enable liquid but not steam to be transferred and to maintain different pressures within the two devices, the communication between the evaporators and corresponding absorbers being steam-side communication.

A pressure substantially less than atmospheric is maintained in the evaporators and absorbers, the pressure in the evaporator and absorber of the first device being less than that of the corresponding elements of the second heat exchanger. The absorbers are connected to the generators (3, 3A).

The evaporator (1) of the first device receives heat from a source external to the apparatus via the heat exchangers (5, 5/1), the pump (P2) and the pipes (4/1, 6/1), whereas the evaporator (1A) of the second device receives heat from the absorber (2) of the first device via the heat exchanger (5A), the pump (P7) and the pipes (4A, 4B, 6A).

In the evaporators (1, 1A) an evaporating liquid is present having a freezing point of less than −15° C., for example a solution of lithium bromide in water with a low saline concentration such as to cause the saturation temperature to rise by about 3° C., such a value not influencing the machine operation, and allowing evaporation at a temperature of less than 0° C., to enable heat to be recovered from the external air even with an air temperature of less than 0° C., for example down to about −5° C.

In said evaporators the evaporating solution is withdrawn to be returned to the top thereof after being passed through a pipe (4, 4A) by a pump (P5, P7).

The pump (P7) pumps the evaporating liquid of the second device through the heat exchangers (E13, 5A) and the pipes (4A, 4B). In the heat exchanger (E13) the evaporating liquid of the second device transfers heat to an external fluid, for example hygienic water fed through the entry and exit pipes (22, 22/1), and absorbs heat in the heat exchanger (5A) from the absorbent liquid of the first device (2) to return to the evaporator (1A) via the pipe (6A). The hygienic water preheated in the heat exchanger (E13) is fed through the pipe (22/1) to the heat exchanger (E14) where it reaches its operating temperature by transferring heat to the cooling fluid of the absorber of the second device, as described hereinafter. The pump (P5) withdraws the evaporating solution of the first device and feeds it into the evaporator via the valve (FV09) and the pipes (4, 6).

In the evaporator (1) there is provided a heat exchanger (5/1) through which the evaporating fluid of the first device absorbs heat from a fluid external to the apparatus, which is then generally used to cool the air.

A pump (P2) withdraws said fluid from the heat exchanger (5/1) through the pipe (4/1) and feeds it to the heat exchanger (5) external to the apparatus, to then again feed it to the heat exchanger (5/1) via the pipe (6/1).

In the absorbers (2, 2A) there is present a liquid, preferably an aqueous lithium bromide solution, which absorbs the steam generated in the adjacent evaporator, this liquid being withdrawn through a pipe (7, 7A) by pumps (P3, P4), to be recycled to the top of the absorbers via the pipes (8, 8A). Before being returned to the top of the absorbers, said liquid withdrawn from the two absorbers (2, 2A) is mixed and then at least partly fed to the generators so as to ensure that the dilute solution fed to the generators has a concentration intermediate between those leaving the absorbers, even in the case in which steam has not been absorbed in the second stage absorber or only a part has been absorbed, because of heat absorption by an external fluid, such as hygienic water, by the second stage evaporator via the heat exchanger (E13).

Said absorbers (2, 2A) are connected together by a member forming a syphon which enables the liquid level in the absorbers to be maintained constant even though the pressure in the absorber (2) is less than that in the absorber (2A).

The liquid fed to the generators is withdrawn via the pipe (9) and the pump (1) and fed to the heat exchanger (10) in which it absorbs heat to cool the liquid leaving the generator (3) through the pipe (17B). On leaving the heat exchanger (10) the liquid concentrated in the generator (3) is fed through a liquid/vapour separation device (17A) of known type and via a pipe 16 is mixed with the weak solution, to form an absorbent solution which is again fed into the absorbers of the two devices via the pipes (8, 8A). The dilute solution leaving the heat exchanger (10) is fed through the pipe (9A) into a subsequent heat exchanger (10A) in which it is heated by cooling the solution returning from the generator (3A) via the pipe (9A). This partially concentrated solution is fed via a liquid/vapour separator (17) and a pipe (13B) to the generator (3), the steam produced in the generator (3A) being fed through the pipe (12A) to the steam-condensing heat exchanger (11) which is the element by which heat energy is fed to the generator (3), the condensed steam leaving said heat exchanger being fed through the pipe (14A) to a liquid/vapour separator (15A) and then through the pipe (12) through which the steam leaving the generator (3) passes. The steam which condenses in the heat exchanger (11) has a saturation pressure greater than that produced in the generator (3), so that at the exit from the separator (15A) it partly re-evaporates and together with the condensate and with the steam produced in the generator (3) is fed via the pipes (12, 12B) to the steam-condensing heat exchangers (13,E15) where the steam condenses and is fed via the pipes (14. 14/1) to a liquid/vapour separator (15), and via the pipe (14/2), the valve (FV03) and the pipe (14/3) to the evaporator (1A) of the second device and to the evaporator (1) of the first device, the two evaporators being in communication via the syphon pipe (6A).

During the summer season the liquid withdrawn from the absorber (2A) of the second device is fed through the three-way valve (FV05) and the pipe (7B) to a heat exchanger (21) where it transfers heat to a fluid external to the apparatus, generally air, and to a return pipe (7C), to be then mixed with the corresponding fluid originating from the first device, any hygienic hot water requirement in this configuration causing the automatic starting of the pump (P6) so that the hygienic water originating from the pipe (22) is firstly preheated within the heat exchanger (E13) by cooling the evaporating liquid of the second device (1A), which is fed by the pump (P7) through the pipe (4A) and then raised to utilization temperature in the heat exchanger (E14) where it is heated by the cooling fluid of the absorber (2A) of the second device, fed by the pump (P6) through the pipe (20A). The heat produced in the absorber (2A) of the second device is simultaneously dissipated both by the heat exchanger (21) and by the heat exchanger (20), the automatic control of the apparatus in this case causing a decrease in the r.p.m. of the fan (V1) so as to reduce the thermal capacity of the heat exchangers (21, 13) to the advantage of the heat exchangers (E14, E15).

When used in the summer season as an icy water producer for air conditioning, the apparatus has a C.O.P. of about 0.6.

Any requirement for hot hygienic water by removing heat via the heat exchanger (E13) of the evaporator (1A) of the second device renders the absorber (2A) of the second stage inoperative, and the apparatus becomes a two-stage absorber of traditional type, having a C.O.P. of about 1.2, as known to the expert of the art.

In addition, if the hygienic water requirement is insufficient to absorb all the heat generated in the absorber (2) of the first device, the C.O.P. assumes an intermediate value of between 1.2 and 0.6 proportional to the heat quantity subtracted relative to the total subtractable.

The heat required for hot hygienic water production is produced under heat pump conditions, being equal to the sum of the heat subtracted from the icy water by the heat exchanger (5/1) and the heat fed to the apparatus by the heating element (11A).

In the winter season the valve (FV05) prevents the absorbent liquid of the second device passing through the heat exchanger (21), the cooling of the absorber (2A) of the second device taking place via the heat exchanger (20), the delivery pipe (20A), the return pipe (20B) and the pump (P6). In the heat exchanger (20) the absorbent liquid of the second device undergoes heat transfer against a fluid external to the apparatus, generally the water fed to the fan coils for environmental heating. This cooling water for the absorbent solution of the second device is pumped by the pump (P6) through the heat exchangers (E14, E15), in the heat exchanger (E4) it yielding heat to any hygienic water required, and in the steam-condensing heat exchanger (E15) it absorbing heat to condense the steam originating from the generator (3). The three-way valve (FV04) enables hot water to be fed to the fan coils during the winter season, whereas in the summer season it enables it to be shut off. Again in the winter season, during operation as a heat pump, the evaporating liquid of the first device is fed by the pump (P5) through the pipe (4), and before being returned to the evaporator via the valve (FV09), the pipe (6/2) and the pipe (7B), is fed to the heat exchanger (21), where it absorbs heat from the external air, aided in this function by the heat exchanger (13) connected in parallel with the heat exchanger (21) via the three-way valves (FV02, FV07). After passing through the heat exchangers (21, 13), the evaporating liquid of the first device is returned to the evaporator (1) via the valve (FV06) and the pipe (6/3). By means of the three-way valve (FV08) the evaporating solution of the first device can be passed through the heat exchanger (E12) in which it absorbs heat from the cooling water of the absorber (2A) of the second device used for heating a fluid external to the apparatus, for example air by means of fan coils. This fluid, fed by the pump (P6) through the pipes (20A, 20B), and by means of the automatic timed operation of the three-way valve (FV08), defrosts the heat exchangers (21, 13) through which the evaporating fluid of the first device absorbs heat from the external air. The apparatus has a C.O.P of about 1.5 during winter operation as a heat pump. Moreover if, during operation as a heat pump. heat were available at a temperature sufficiently high as to be able to be absorbed by the evaporator of the second device, the C.O.P would assume a value of about 2. If the external air temperature falls below the limiting value for operation as a heat pump, the apparatus is advantageously able to operate as a normal gas boiler. The evaporating liquid originating from the first device (1) via the pipe (45), the pump (P5), the three-way valve (FV09) and the pipe (6/2) is fed for a controlled time to the heat exchangers (13, 21), and is mixed via the three-way valve (FV06) and the pipe (7C) with the absorbent solution of the two devices to create a strongly diluted solution, this solution having a concentration intermediate between the concentration of the solution leaving the absorber and the solution present in the evaporators, and being fed to the generators (3, 3A) via the pump (P1) and the heat exchangers (10, 10A) by means of the previously indicated pipes.

The steam produced in the generator (3) is fed via the pipe (12) to the steam-condensing heat exchangers (E15) in which it condenses and yields heat to the water which, fed by the pump (P6), yields heat to a fluid external to the apparatus, generally air heated by means of fan coils.

The condensate from the heat exchanger (E15) passes through the pipe (14), through the liquid/steam separator (15), through the pipe (14/2) and through the three-way valve (FV03), where it is mixed with the solution fed to the generators via the pipe (8B). To leave the boiler state, the valve (FV03) is switched over so that the condensate returns to its correct levels in the evaporators.

The system described with reference to the accompanying drawing has the following advantages: it allows evaporation within the evaporator of the first device at a temperature of less than 0° C., so enabling heat to be recovered from the external air even if this is at less than 0° C., and leading to significant saving in winter heating; it uses the pumps (P3, P4) for recycling the absorbent liquids to the absorbers (2, 2A), so ensuring effective heat transfer even with the machine thermal load varying down to about 10% of the total thermal load, and allowing liquids to pass between the absorbers for level compensation via the syphon members; it enables the apparatus to operate in various operational modes, either as a heat pump in the winter season, as an icy water producer in the summer season for air conditioning with possible production of hygienic hot water, or for producing hygienic hot water in intermediate seasons by subtracting heat from the external air while operating as a heat pump.

What is claimed is:

1. A heat pump comprising first and second absorption devices each having an evaporator (1;1A), an absorber (2;2A) containing a steam absorbing liquid to form a dilute solution, a generator (3;3A), a heating element (11;11A) for boiling absorbing liquid in the generator with the formation of steam and a condensing heat exchanger (11;13, E15) for condensing the steam, whereby the pressure present in the first generator (3) is less than the pressure present in the second generator (3A)

means for maintaining within the evaporator (1) and absorber (2) of the first device a pressure less than that within the evaporator (1A) and absorber (2A), respectively, of the second device, comprising a first syphon connected between the evaporators (1,1a) and second syphon connected between the absorbers (2,2A), a fluid conduit for withdrawing the liquid present in the second evaporator (1A) by a pump (P7), passing it through a heat exchanger (5A) for absorbing heat and returning it to the second evaporator (1A), a fluid conduit for withdrawing dilute solution from the absorbers (2,2A), mixing a portion thereof and feeding the mixed dilute solution by a single pump (P1) to the second generator (3A) and to the first generator (3) in succession, fluid conduits for returning the condensed liquid from the condensing heat exchangers (11;13,E15) to the evaporators (1,1A), fluid conduits for connecting the generators (3A) and to the first generator (3,3A) to the absorbers (2,2A) to feed them with the concentrated absorbing liquid after cooling it in heat exchangers (10,10A) in which the dilute liquid originating from the absorbers (2,2A) is heated, an external heat source for the second heating element (11A) an a solution of low freezing point in the first evaporator (1).

2. A heat pump as claimed in claim 1, characterised in that said solution of low freezing point is a solution of lithium bromide in water.

3. A heat pump as claimed in claim 2, characterised in that said solution in water contains about 20% of lithium bromide by weight.

* * * * *